United States Patent

[11] 3,612,600

| [72] | Inventor | Luis G. Salichs<br>44-15 25th St., Bayaman, P.R. 00619 |
|---|---|---|
| [21] | Appl. No. | 41,263 |
| [22] | Filed | May 28, 1970 |
| [45] | Patented | Oct. 12, 1971 |

[54] FOLDING UTILITY TRAILER
6 Claims, 9 Drawing Figs.

| [52] | U.S. Cl. | 296/27, 296/1 |
|---|---|---|
| [51] | Int. Cl. | B60p 3/34 |
| [50] | Field of Search | 296/26, 27, 1 |

[56] References Cited
UNITED STATES PATENTS

| 2,826,425 | 3/1958 | Hoeper | 296/27 |
|---|---|---|---|
| 2,691,546 | 10/1954 | Torrance | 296/27 |

*Primary Examiner*—Philip Goodman
*Attorney*—Berman, Davidson and Berman

ABSTRACT: A folding utility trailer which while retaining its full length is folded to a width slightly wider than the width of an individual wheel. The wheels are moved to a tandem position supporting the folded trailer so that it can be rolled to and from a storage position.

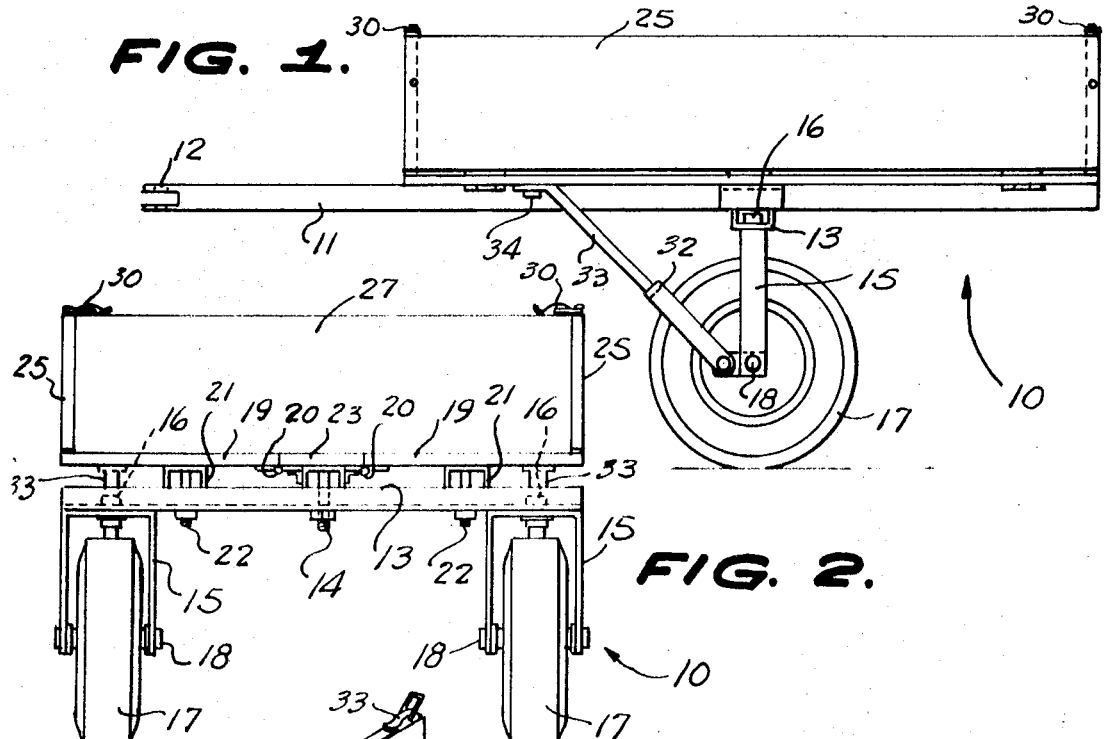
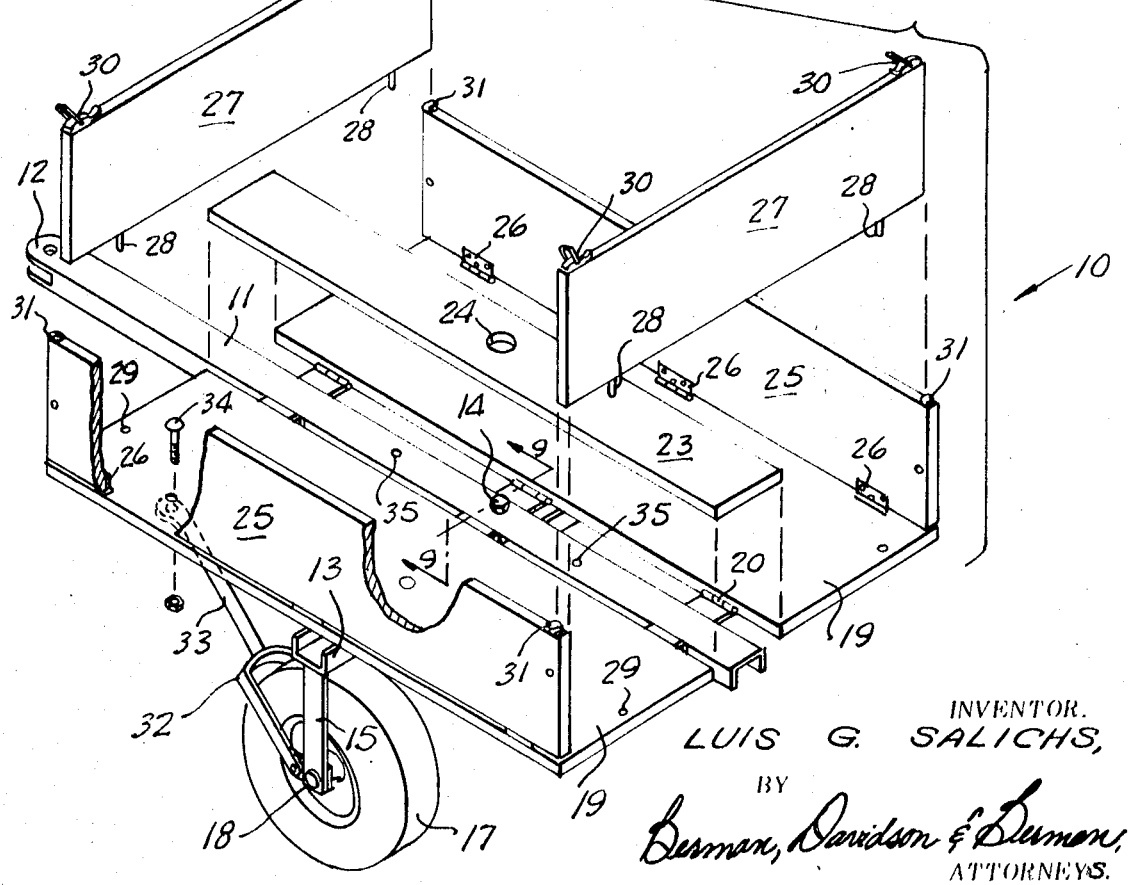

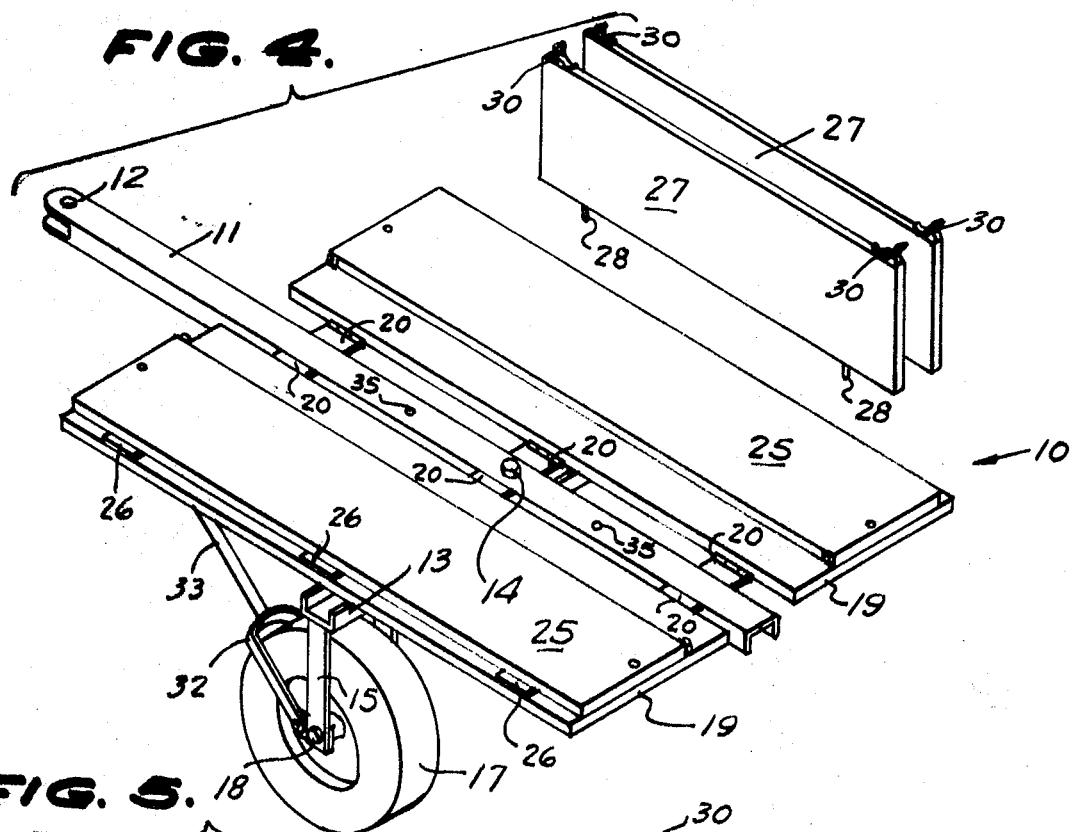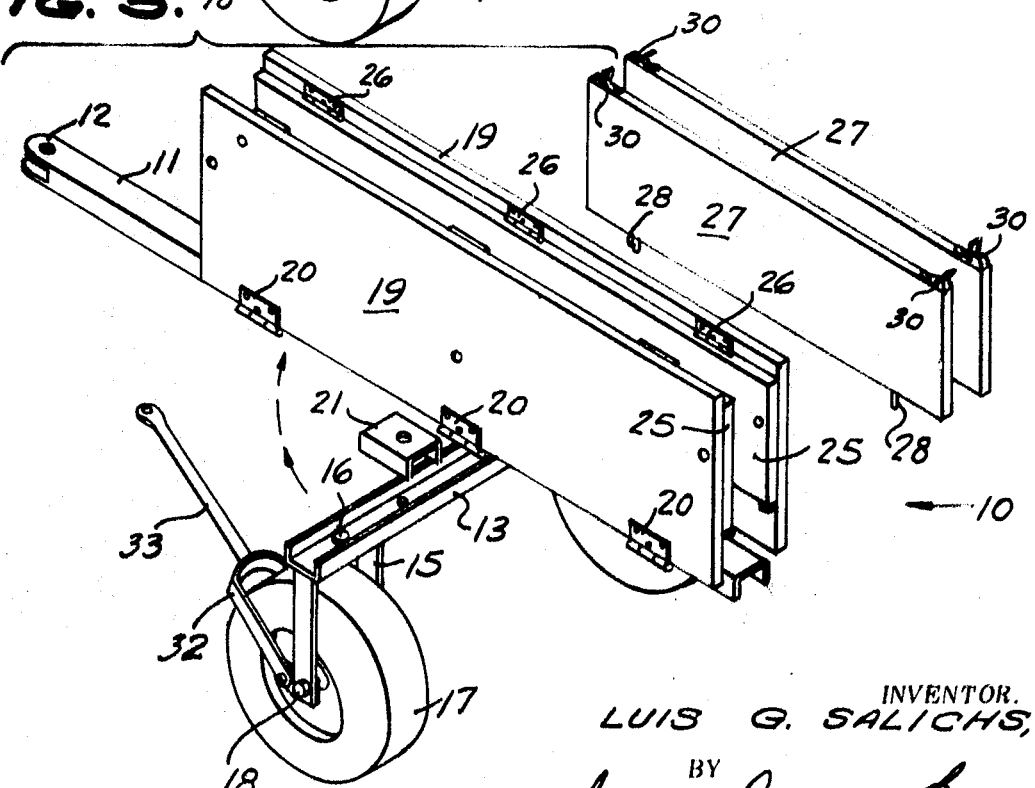

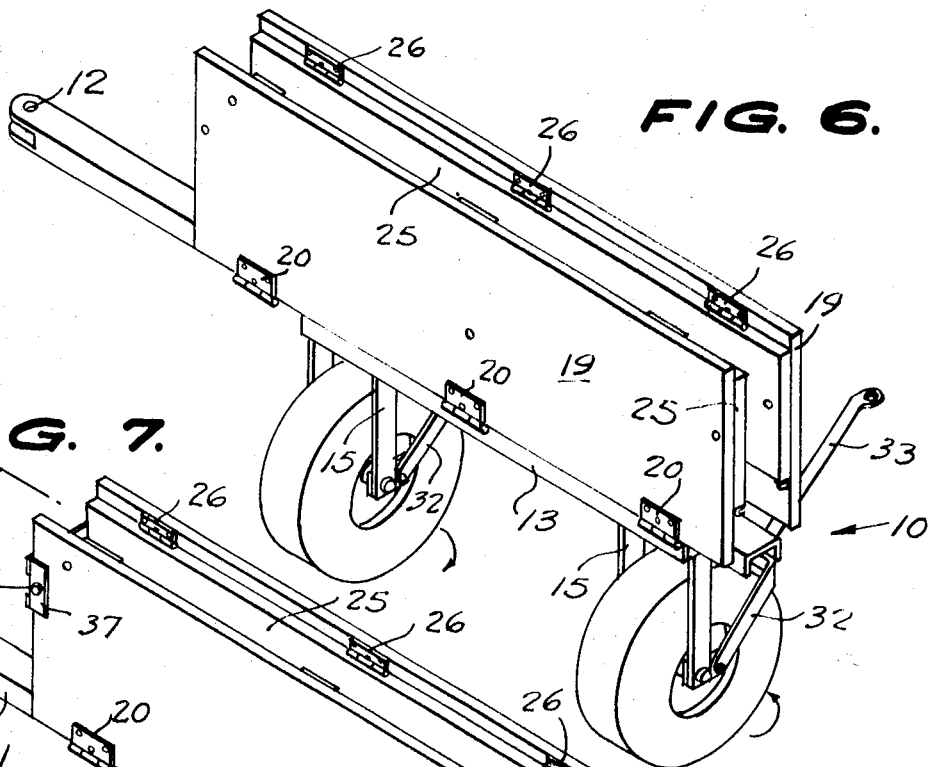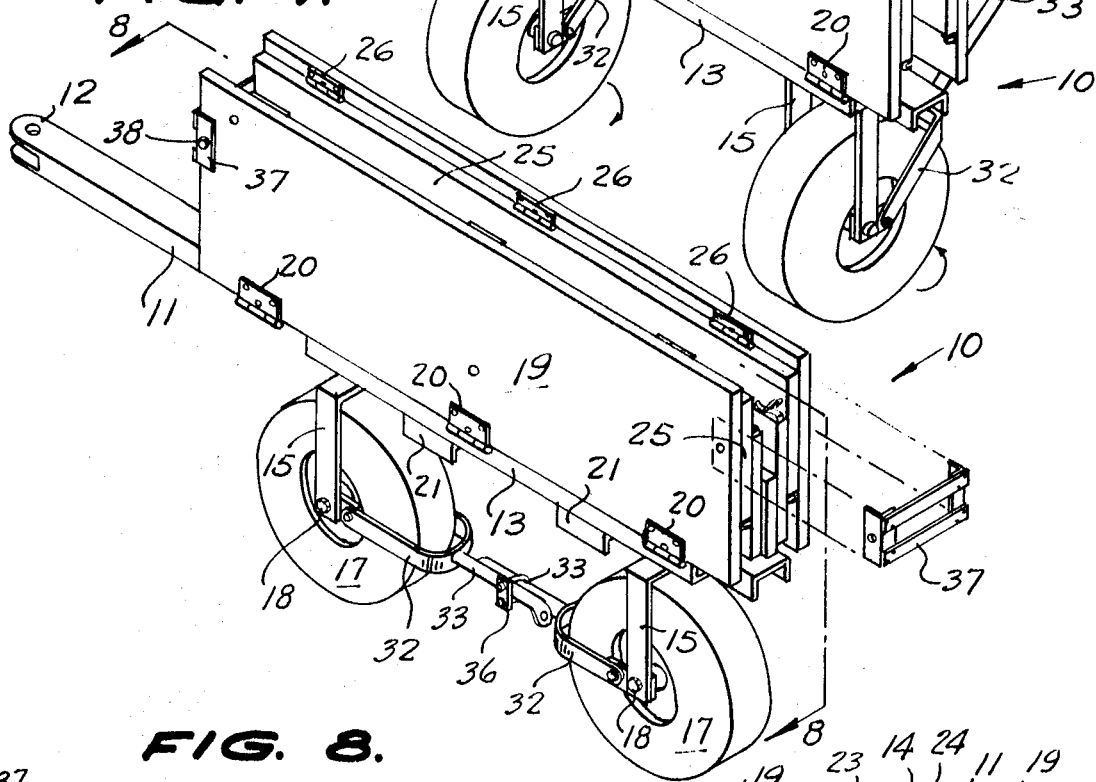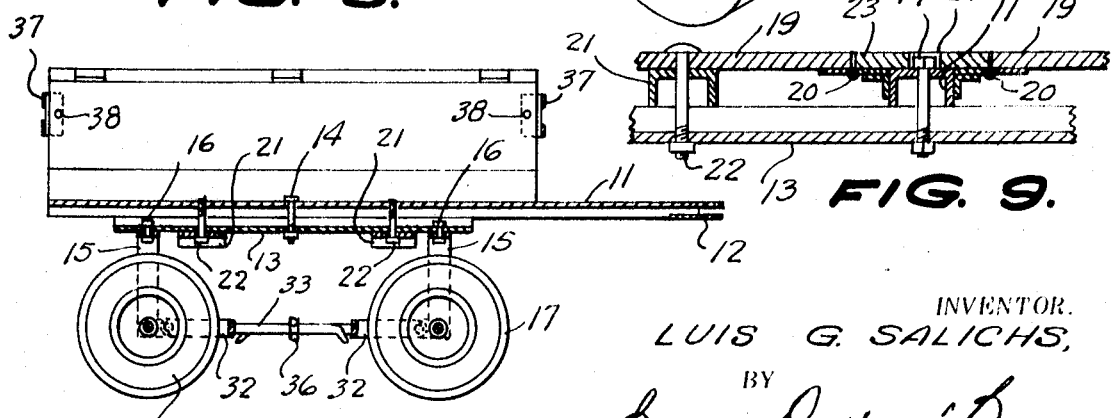

FOLDING UTILITY TRAILER

BACKGROUND OF THE INVENTION

1. Field of the Invention

The present invention relates to folding utility trailers which can be stored in a minimum of space when out of use.

SUMMARY OF THE INVENTION

A folding utility trailer is disclosed in which the box folds to a thickness slightly greater than the width of one of the wheels and the wheels are swung to a tandem position supporting the folded box. The trailer can be moved into and out of storage position on the tandem wheels and is stored resting on the tandem wheels.

The primary object of the invention is to provide a folding utility trailer which is quite thin in folded condition and which is supported on its wheels for movement to and from storage when folded.

Other objects and advantages will become apparent in the following specification when considered in the light of the attached drawings.

BRIEF DESCRIPTION OF THE DRAWINGS

FIG. 1 is a side elevation of the invention with the trailer ready for normal use;

FIG. 2 is an end elevation of the structure illustrated in FIG. 1;

FIG. 3 is an exploded perspective view illustrating the removal of the center and end gates prior to folding of the trailer;

FIG. 4 is a view similar to FIG. 3 illustrating the beginning of the folding of the trailer;

FIG. 5 is a view similar to FIG. 3 with the floor folded on the frame;

FIG. 6 is a perspective view which illustrates the folding of the wheel-support frame;

FIG. 7 is a perspective view of the trailer in its completely folded condition;

FIG. 8 is a sectional view taken along the line 8—8 of FIG. 7, looking in the direction of the arrows; and FIG. 9 is transverse sectional view taken along the line 9—9 of FIG. 3, looking in the direction of the arrows, with parts broken away for convenience of illustration.

DESCRIPTION OF THE PREFERRED EMBODIMENT

Referring now to the drawings in detail wherein like reference characters indicate like parts throughout the several figures the reference numeral 10 indicates generally a folding utility trailer constructed in accordance with the invention.

The trailer 10 includes an elongate channel frame member 11 having a hitch 12 on its forward end to connect the trailer 10 to a towing vehicle.

A transverse channel frame member 13 is pivotally secured to the channel frame member 11 by a pivot bolt 14 extending perpendicularly therethrough. A transverse channel frame member 13 has the pivot bolt 14 extending therethrough intermediate the opposite ends thereof. A wheel-support yoke 15 is pivotally secured to each end of the transverse frame member 13 by a pivot bolt 6.

A rubber-tired wheel 17 is journaled for rotation in each of the yokes 15 on a horizontally extending spindle 18.

A bottom board 19 is hingedly secured to each side of the channel frame member 11 by a plurality of hinges 20. The hinges 20 are secured to the channel frame member 11 so as to space the inner edges of the bottom boards 19 outwardly from the channel frame member 11 as can be clearly seen in FIGS. 4 and 9.

A relatively short channel spacer 21 is positioned between the transverse channel member 13 and the bottom board 19 on each side and a bolt 22 extends through the bottom board 19, channel spacer 21 and the transverse channel member 13 to secure the trailer in erected position.

A center board 23 has a relatively large bore 24 extending therethrough intermediate the opposite ends thereof. The center board 23 rests on the channel frame member 11 with the head of the bolt 14 extending into the bore 24. The center board 23 engages the bottom boards 19 on each side edge thereof.

An elongate generally rectangular sideboard 25 is secured to the outer side edges of each of the bottom boards 19 by a plurality of hinges 26. The sideboards 25 are adapted to fold flat on the bottom boards 19 into the position illustrated in FIG. 4.

A generally rectangular end gate 27 is positioned at each end of the bottom boards 19 extending between the sides 25. The end gate 27 has depending dowels 28 secured thereto which project through bores 29 in the ends of the bottom boards 19. Releasable clasps 30 are secured to the end gates 27 and engage with keepers 31 on the top edge of the sideboards 25 to secure the end gates 27 in position on the erected trailer.

A brace yoke 32 is connected to each of the yokes 15 adjacent the spindle 18. An arm 33 extends upwardly from the brace yoke 32 and has its upper end secured to the bottom board 19 by a bolt 34.

When it is desired to fold the trailer 10 first the clasps 30 are released and the end gates 27 are removed. The center board 23 is also removed. Next the bolts 34 are removed to release the brace arms 33. The bolts 22 are then removed releasing the bottom boards 19 from the transverse channel frame member 13. The sideboards 25 are then folded onto the bottom boards 19 and the bottom boards 19 are hinged to an upright position as seen in FIG. 5.

The transverse channel 13 is then rotated on the bolt 14 until it is parallel and underlies the channel frame member 11. The channel spacers 21 are then placed under the transverse frame member 13 and bolts 22 are passed upwardly through the channel spacer 21 and the transverse channel member 13 into tapped bores 35 in the channel frame member 11. The wheels 17 are pivoted with their support yokes 15 on the bolts 16 so that they are aligned in the position illustrated in FIG. 7. The brace arms 33 are brought into contact and secured together by a U-bolt clamp 36. The end gates 27 and center board 23 are then positioned on the frame member 11 between the sideboards 25 in an upright position. A U-shaped retainer 37 is engaged over the folded bottom boards 19 and a bolt 38 extends through both ends of the retainer 37 and the bottom boards 19 as well as the sideboards 25 to secure the folded trailer in its folded position. As can be seen in FIGS. 7 and 8 the folded trailer is supported on its wheels which are now in tandem position and it can be rolled to a storage position where it is stored on the wheels 17.

When it is desired to use the trailer the simple operation of folding the trailer is reversed and the trailer is ready for use.

Having thus described the preferred embodiment of the invention it should be understood that numerous structural modifications and adaptations may be resorted to without departing from the spirit of the invention.

What is claimed is:

1. A folding utility trailer comprising an elongate longitudinally extending frame member, a transverse frame member secured to said longitudinal frame member by a pivot bolt extending through said longitudinal frame member intermediate the opposite ends thereof and through the center of said transverse frame member, a yoke pivotally secured to each end of said transverse frame member, a wheel journaled in each of said yokes, a pair of bottom boards hingedly secured to opposite sides of said longitudinal frame member and foldable into a closely spaced parallel position generally overlying said longitudinal frame member, means releasably securing said bottom board to said transverse frame member, means extending from said yoke to said bottom board for bracing said yoke, and means for releasably securing said transverse frame member to said longitudinal frame member with said transverse frame pivoted to lie parallel to said longitudinal frame member.

2. A device as claimed in claim 1 wherein means are provided for releasably securing said yoke braces together with said wheels pivoted to tandem relationship beneath the folded trailer.

3. A device as claimed in claim 1 wherein a pair of opposite sides are hingedly secured to the outer edges of said bottom boards and a pair of end gates are releasably secured to the opposite ends of said sideboards.

4. A device as claimed in claim 3 wherein means are provided for releasably securing said bottom boards in erect closely spaced parallel position overlying said longitudinal frame member.

5. A device as claimed in claim 4 wherein means securing said bottom boards in folded position supports said end gates between said bottom boards.

6. A device as claimed in claim 1 wherein a centerboard is supported on said longitudinal frame member extending from the inner edge of one of said bottom boards to the inner edge of the other said bottom boards with said trailer in erected condition.